US012737391B2

(12) United States Patent
Arumugam et al.

(10) Patent No.: US 12,737,391 B2
(45) Date of Patent: Sep. 15, 2026

(54) HYBRID COMPUTING FOR ACCESS-LESS SURGICAL RETRIEVAL

(71) Applicant: Bank of America Corporation, Charlotte, NC (US)

(72) Inventors: Rajalakshmi Arumugam, Chennai (IN); Ramya Sivaramakrishnan, Chennai (IN); Roshan Miranda, Mumbai (IN); Anshul Saini, Gurugram (IN); Ankit Lakhtakia, Gurugram (IN); Shruti Gandhi, Gurugram (IN); Sanjay Lal Gupta, Gurugram (IN); Nabh Kumar, Gurugram (IN); Vineet Khurana, Gurugram (IN); Jonathan David Wilman, Hertfordshire (GB)

(73) Assignee: Bank of America Corporation, Charlotte, NC (US)

( * ) Notice: Subject to any disclaimer, the term of this patent is extended or adjusted under 35 U.S.C. 154(b) by 592 days.

(21) Appl. No.: 18/370,912

(22) Filed: Sep. 21, 2023

(65) Prior Publication Data

US 2025/0103940 A1 Mar. 27, 2025

(51) Int. Cl.

| | |
|---|---|
| ***G06N 10/20*** | (2022.01) |
| ***G06N 10/40*** | (2022.01) |
| ***G06N 10/80*** | (2022.01) |

(52) U.S. Cl.

CPC ............. *G06N 10/80* (2022.01); *G06N 10/20* (2022.01); *G06N 10/40* (2022.01)

(58) Field of Classification Search

None

See application file for complete search history.

(56) References Cited

U.S. PATENT DOCUMENTS

| | | | |
|---|---|---|---|
| 11,477,016 B1 * | 10/2022 | Carter, Jr. | ............. G06F 21/577 |
| 11,514,176 B1 | 11/2022 | Magerkurth et al. | |
| 11,515,999 B1 | 11/2022 | Nelson | |
| 11,580,303 B2 | 2/2023 | Guo et al. | |
| 2008/0147633 A1 | 6/2008 | Chandley | |

(Continued)

OTHER PUBLICATIONS

Chang, Yen-Jui, et al., "The Prospects of Quantum Computing for Quantitative Finance and Beyond", Apr. 2023, IEEE Nanotechnology Magazine, vol. 17, No. 2, pp. 31-37. (Year: 2023).*

*Primary Examiner* — Scott A. Waldron

(74) *Attorney, Agent, or Firm* — Weiss & Arons LLP

(57) ABSTRACT

Systems and methods for confidential database surgical search and access-less retrieval using a hybrid-computing-powered system with multi-thread processing are provided. The systems and methods may include a quantum processor and a classical processor. The systems and methods may include requesting data elements pertinent to reports. The systems and methods may include authenticating requests and creating classical request strings via a classical processor. The systems and methods may include interfacing classical request strings with a quantum processor. The systems and methods may include running Grover's searches in parallel over the request strings. The systems and methods may include fetching data from smart contracts within ledgers and sub-ledgers within a blockchain. The systems and methods may include pulling dynamic market data through a legacy transformation platform including dynamically derived data values and a machine learning model (MLM).

20 Claims, 6 Drawing Sheets

(56) References Cited

U.S. PATENT DOCUMENTS

| | | | | |
|---|---|---|---|---|
| 2009/0164435 | A1* | 6/2009 | Routt | B82Y 10/00 |
| 2020/0143257 | A1 | 5/2020 | Neelamana | |
| 2020/0322159 | A1 | 10/2020 | Xu et al. | |
| 2020/0349142 | A1 | 11/2020 | Padmanabhan | |
| 2021/0081400 | A1 | 3/2021 | Park et al. | |
| 2021/0357229 | A1 | 11/2021 | Gonciulea et al. | |
| 2022/0138705 | A1 | 5/2022 | Wright | |
| 2022/0385472 | A1 | 12/2022 | Pishdadian et al. | |
| 2023/0053590 | A1 | 2/2023 | Shin | |
| 2024/0078457 | A1* | 3/2024 | Stockert | G06N 10/20 |

* cited by examiner

HYBRID COMPUTING FOR ACCESS-LESS SURGICAL RETRIEVAL

FIELD OF TECHNOLOGY

Aspects of the disclosure relate to hybrid computing. Specifically, aspects of the disclosure relate to hybrid computing systems and methods for access-less database surgical search and data retrieval.

BACKGROUND OF THE DISCLOSURE

Organizations rely heavily on reports for reviewing performance, executing control routines, and making strategic decisions to support clients and investors.

It is desired, therefore, to provide insights into support mechanisms behind dynamic data elements, logic, formulae, and assumptions used to generate various types of reports used by organizations.

But ledger data including, but not limited to, transactions and product line information, are usually highly confidential in nature. Therefore, due to regulatory restrictions, users may not have access to data elements, rules, and derivative formulae underlying these confidential reports.

Chief Security Officer (CSO) report users, for example, desire a selective set of attributes, data elements, and derivative formulae used in building entries in confidential reports. This is desired for data interpretation and charting decisions based on reports. Further, this problem exists globally across various institutions processing confidential reports internally.

To address this problem, the disclosure provides a hybrid-computing system using both classical and quantum computing for surgical, access-less data retrieval. Classical computing is the use of bits of information to make computations. Classical computing is generally not well equipped for simultaneous and dynamic computing with multiple and parallel searches and threads running in real-time.

Quantum computing is a more viable approach for a surgical search and access-less data retrieval method. Quantum computing is the use of quantum-mechanical phenomena such as superposition, spin, and entanglement to perform computations. A bit in a quantum computer is called a qubit. Quantum computing differs from classical computing in such a way that a qubit can be in a zero state and a one state at the same time.

Provided herein are systems and methods for a hybrid-computing-based surgical extraction engine. Hybrid computing is the use of both classical and quantum computing systems. The systems and methods provided may integrate an application programming interface (API) with a quantum computing platform (QCP) to transmit and respond to various user requests.

Users may desire specific sets of attributes, formulae, logic, rules, or data within a confidential database. Users may not have blanket access to these confidential databases. The methods and systems provided herein enable users to surgically obtain required information in an access-less fashion via hybrid (classical-quantum) computing.

The methods and systems provided may include combinations of multiple elements from various data systems including distributed ledger systems (e.g., derivative formulae, Forex rates, etc.). Further, the methods and systems may provide users with backend information from a machine learning model (MLM). For example, weightage, is a typical backend datapoint requested from an MLM. Weightage may explain decision paths taken, for instance, by artificial intelligence (AI) models, to arrive at outputs.

The systems and methods provided may orchestrate the execution of multiple Grover's search processes and threads dedicated to an attribute of a request. The Grover's search processes and threads may run in parallel on multiple data systems.

The systems and methods may be executed through smart contracts in a permissioned or private blockchain. The systems and methods may also provide surgical extraction of a selective set of attributes from distributed ledgers, sub-ledgers, dynamically changing derivative formulae, and data required from both standard and non-standard data storage systems. Non-standard data storage systems may include, for example, highly confidential storage systems. Non-standard data storage systems may also include, for example, unstructured data systems.

The systems and methods provided may fetch weightages for various data elements and attributes, including but not limited to, logics formulae, decision paths, and MLM elements and attributes. The systems and methods thereby use a legacy transformation platform to transform qubits into data for precise interpretation of target state values for various elements and attributes.

Extracted values of elements and attributes may be routed via an API interface and back to users. A user is any individual who uses the systems and methods provided herein. Users may be provided with relevant data in real time needed to interpret reports. Further, users do not desire direct access to data storage or retrieval platforms according to geographic information systems (GIS) policies.

One aspect of the disclosure provides systems and methods using a multi-threading process whereby Grover's algorithms are executed in parallel. A thread and process may be dedicated to one attribute and may search smart contracts on a blockchain and other data sources. Another aspect of the disclosure provides systems and methods for fetching MLM information, including, but not limited to, weightage, threshold parameters, etc. The prior art—U.S. Pat. Pub. No. 2021/0357229—discloses a Grover's technique using Hadamard/Pauli gates, and only for searching in general—not applied to surgical, access-less retrieval of confidential data.

Further, another aspect of the present disclosure provides systems and methods that may not receive any information from users in identifying a block of data. In addition, the systems and methods provided are not specific to blockchain searching. A user may not desire any information or knowledge about where the requested data is located or what storage system is involved. The prior art—U.S. Pat. Pub. No. 2023/0053590—is specific only to blockchain searches and requires users to have specific information about data location and storage systems.

Another aspect of the disclosure is focused on extracting a select set of attribute values from blockchain ledgers and sub-ledgers through parallel computing techniques. The prior art (e.g., U.S. Pat. No. 11,580,303) focuses on keyword extraction—not various attribute values such as weightage, dynamic thresholds, dynamic formulae, and MLM elements.

It would be desirable, therefore, to provide systems and methods for improved confidential database search and access-less data retrieval.

It would be further desirable for users to be able to utilize hybrid computing to make meaningful decisions without having blanket access to confidential databases.

SUMMARY OF THE DISCLOSURE

Aspects of the disclosure relate to hybrid-computing-powered systems with multi-thread processing, and associated methods, for database search and data retrieval. A hybrid system, as described herein, may include a classical processor and a quantum processor. The quantum processor may include a default number of quantum threads. A quantum thread may include a default number of quantum circuits.

Systems and methods for confidential database searching and data retrieval using a hybrid-computing-powered system are provided. The systems and methods may utilize multi-thread computing including both a classical processor and a quantum processor.

Systems and methods may include interpreting reports. Systems and methods may also include requesting data elements pertinent to reports.

Systems and methods may include authenticating requests for data elements. Systems and methods may include creating request strings via a classical processor.

Systems and methods may include interfacing classical request strings with a quantum processor. Systems and methods also may include running Grover's diffusion operators in parallel over the request strings.

Systems and methods may fetch requests for any number of data elements from smart contracts within a ledger. Systems and methods may also fetch data from other data sources via a legacy transformation platform.

Systems and methods may include dynamically derived data values and an MLM. Systems and methods may also include processing logic and an AI and machine learning (ML) processor.

Systems and methods may pass dynamically derived data values through an MLM. Systems and methods may fetch weightage given to data elements in an MLM. Systems and methods may also route weightage for data elements back through a QCP, an API controller, a request management module, and an authentication controller. Systems and methods may enable a user to receive requested data elements, e.g., weightages, decision paths, and other attributes derived from AI/ML engines.

Systems and methods may include one or more other sources of data including, for example, current market data. Current market data may be analyzed, for example, via dynamic derivative formulae.

Systems and methods may include one or more ledgers. Ledgers may be located, for example, within a private or public blockchain. Ledgers may include one or more subledgers.

Systems and methods may also include data elements including, for example, derivative formulae, market pricing change, weightage given for data elements in an ML model, and weightage given for decision paths for explainability.

Systems and methods may also include confidential database searching and data retrieval using a hybrid-computing-powered system with multi-thread computing. Systems and methods may include a classical processor and a quantum processor.

Systems and methods may also include interpreting one or more reports. Systems and methods may include requesting, via an API, one or more data elements pertinent to the one or more reports. Systems and methods may include authenticating, via an authentication controller, the requesting one or more data elements.

Systems and methods may also include requesting, via a request management module, a synthesis of one or more request strings, via the classical processor. The synthesis may be in response to the requesting one or more data elements.

Systems and methods may also include interfacing, via an API controller, the one or more request strings with the quantum processor. The quantum processor may be located within a QCP.

Systems and methods may also include converting, via the quantum processor, the one or more request strings into one or more quantum searches. The systems and methods may use one or more Grover's diffusion operators in parallel with one another.

Systems and methods may also include fetching a quantum search for an n-th data element. The n-th data element may be a number ("n") corresponding to a given data element requested. The n-nth data element may be fetched from one or more smart contracts within a ledger.

Systems and methods may also include fetching one or more dynamically derived data values from one or more other data sources via a legacy transformation platform. The legacy transformation platform may include dynamically derived data values and an MLM. The MLM may include processing logic and an AI/ML processor.

Systems and methods may also include passing the fetched dynamically derived data values through the MLM. Further, systems and methods may include fetching weightage given to the dynamically derived data values passed through the MLM.

Systems and methods may also include routing the fetched weightage for the dynamically derived data values back through the QCP, the API controller, the request management module, and the authentication controller. Systems and methods may also include receiving the fetched weightage for the dynamically derived data values.

Systems and methods may also include storing the fetched weightage in a database. Systems and methods may also include using the fetched weightage to make decisions based on the interpretation of the one or more reports.

Systems and methods may also include logging, in a cloud-based control file, the fetched weightage stored in the database. Systems and methods may also include using the cloud-based control file as part of making decisions based on the interpretation of the one or more reports.

Systems and methods may also include determining whether the fetched weightage is authentic. Systems and methods may include only routing the fetched weightage to a user when it is determined that the fetched weightage is authentic.

Systems and methods may also include quantum processor conversion of one or more request strings. The quantum processor converts a bit-based search algorithm to a qubit-based search algorithm.

Systems and methods may also include an AI and ML processor that determines a fetched weightage at least in part using dynamic market data and historical market frequency patterns.

Systems and methods may also include one or more other sources of data including current market data. The current market data may be analyzed via dynamic derivative formulae.

Systems and methods may also include one or more ledgers. The one or more ledgers may include one or more sub-ledgers. The ledgers and subledgers may be located within a permissioned or private blockchain.

Systems and methods may also include a quantum processor. A quantum processor may include a default number of quantum threads, a quantum thread including a default number of quantum circuits.

Systems and methods may fetch weightage given to the dynamically derived data values passed through the MLM.

Systems and methods may fetch weightage including, but not limited to, dynamically derived data values.

Systems and methods may also include fetched dynamically derived data values. Dynamically derived data values may be extracted via derivative formulae, market pricing change, weightage given to one or more data elements in an MLM, and weightage given for decision paths for explainability.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
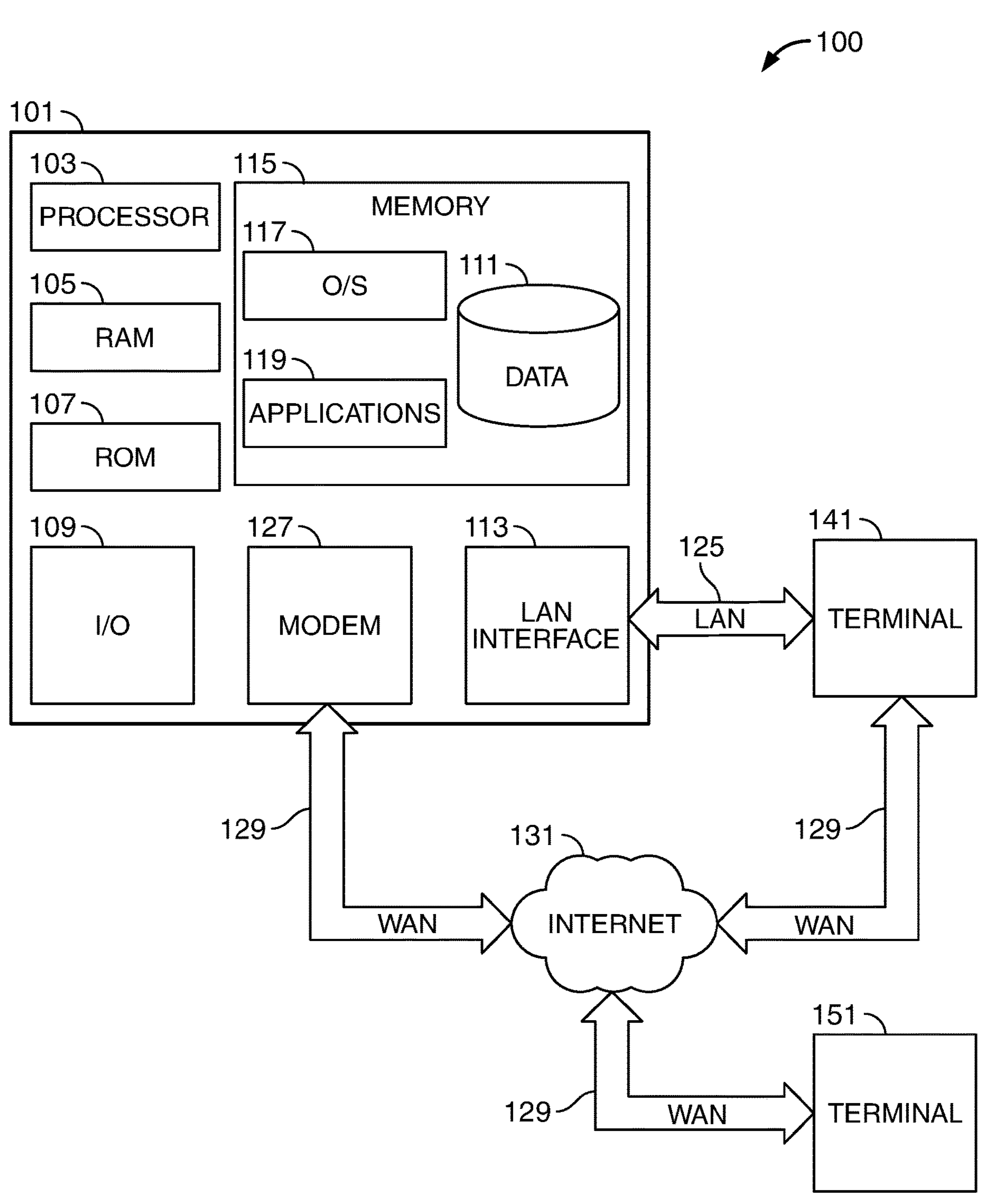
FIG. 1 shows an illustrative system in accordance with principles of the disclosure.

Systems and methods are provided for hybrid-computing-powered systems and methods with multi-thread processing for database search and surgical, access-less data retrieval. The systems and methods use hybrid computing and may include a classical (i.e., non-quantum) processor and a quantum processor. A quantum processor refers to a computing device whose operations can harness aspects of quantum mechanics, such as superposition, interference, and entanglement.

Quantum processors are associated with vastly improved efficiencies over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1. The probabilities can be manipulated using matrix-based quantum gates, which are analogous to classical logic gates. Qubits are therefore able to represent many more data possibilities than a bit-based system of the same size. This allows for greater speed and less memory usage than classical systems.

The quantum processor may include a default number of quantum threads. A quantum thread may include a default number of quantum circuits. Quantum circuits, in turn, refer to hardware and software based computational models that include quantum gates and are used for executing quantum computations. For example, in some embodiments, at least one of the quantum circuits may include a Toffoli gate. A feature of the Toffoli gate is its universal nature—meaning it can represent both classical and quantum operations. In certain embodiments, at least one of the quantum circuits may include a Hadamard gate. A feature of a Hadamard gate is its ability to represent a superposition state.

Systems and methods for access-less surgical data retrieval by hybrid computing are provided herein.

Provided herein are systems and methods for a hybrid-computing-based surgical extraction engine. A hybrid system is a system that uses both quantum and classical techniques. The systems and methods provided may integrate an API with a QCP to transmit and respond to requests from users without data access.

The methods and systems provided may include combinations of multiple elements from various data systems including distributed ledger systems (e.g., derivative formulae, Forex rates, etc.). Further, the methods and systems herein may provide backend information from an MLM, for example, weightage, which explains decision paths taken by models to arrive at various outputs.

The systems and methods may provide orchestration of execution of multiple Grover's search processes and threads running in parallel on multiple data systems.

A Grover's search utilizes Grover's diffusion algorithm. Grover's diffusion algorithm identifies a data element by amplitude amplification. Grover's diffusion algorithm enables surgical data extraction from high volumes of data without costly search operations. Amplitude amplification provides more efficient searching.

The systems and methods may execute through smart contracts in a permissioned or private blockchain to perform surgical extraction of selective set of attributes from distributed ledgers, subledgers, dynamically changing derivative formulae, and data required from non-standard data storage systems.

The systems and methods may fetch weightage given to each formula, weightage for decision paths, weightage given for elements in an MLM used in a legacy transformation platform for precise interpretation of target state values.

Extracted values of elements may be routed via an API interface and back to the users. Users may be provided with relevant data in real time needed to interpret reports without needing direct access to data storage or retrieval platforms according to GIS policies.

One aspect of the disclosure uses a multi-threading process whereby Grover's search algorithms are executed in parallel. Each thread and process may be dedicated to one attribute and may run through smart contracts on a blockchain and other data sources. Another aspect of the disclosure fetches MLM information, including but not limited to weightage, threshold parameters, etc. The prior art—U.S. Pat. Pub. No. 2021/0357229—discloses the Grover's technique using Hadamard/Pauli gates in general for search.

Further, the disclosure does not receive any information from users to identify a block of data and is not specific to blockchain search. Here, the user does not have any information or knowledge about where the required data is located and what storage system is involved. The prior art—U.S. Pat. Pub. No. 2023/0053590—is specific to blockchain searches and requires users to have specific information about data location and storage systems.

Another aspect of the disclosure is focused on extracting a selective set of attribute values from blockchain ledgers and sub-ledgers through parallel computing techniques. The prior art (e.g., U.S. Pat. No. 11,580,303) focuses on keyword extraction.

In an embodiment, systems and methods are provided for the application of parallel (e.g., multi-thread) processes of quantum computing and access-less data search and retrieval. A quantum-based search technique enables searching and surgical extraction for multiple requests for different elements simultaneously. In other words, the methods and systems provided herein enable parallel multi-thread processing.

In another embodiment, systems and methods are provided for a hybrid-computing-based, real-time, surgical extraction of a specific set of attributes. The specific set of attributes are extracted using a quantum search technique from various data systems including structured and unstructured data systems, distributed ledgers, and dynamically changing derivative formulae. The targets are extracted without the need for any direct access to data systems for users.

In yet another embodiment, systems and methods are provided for the retrieval of ML weightage parameters, elements, and formulae, providing explanations for decision paths and interpreting results without providing user access to confidential data.

In yet a further embodiment, systems and methods are provided for integration of API with a quantum channel to facilitate the transmission of requests and responses to and from authorized agents and parties.

In an additional embodiment, systems and methods are provided for instantaneous responses and reference data leads for efficient interpretation processing, thereby saving time, and avoiding delays in procuring the right data from concerned ledger teams.

In yet an additional embodiment, systems and methods provided may apply to dynamically changing data systems.

In yet an additional embodiment, systems and methods provided use computing techniques that do not use full table, database (DB), storage data scans, heavy extract, transform, load (ETL), resource-oriented data searching, or computation systems. This is because the disclosed methods and systems efficiently pick specific pieces of data out of vast and complex databases.

In yet an additional embodiment, systems and methods provided use an approach akin to removing a needle of data from a haystack of vast quantities of data. Thus, the data retrieval is access-less—meaning no access to any databases is required. Data retrieval is also surgical—meaning data is retrieved with efficient and accurate precision.

In yet another embodiment, the systems and methods provided utilize quantum extraction and may be performed on a complex linkage of distributed ledgers and sub-ledgers. Further, the systems and methods provided do not use additional intermediate storage systems, thereby mitigating risk, and reducing overhead of building access control.

In yet another embodiment, the systems and methods provided include requests for one or more data elements. These data elements may include, but are not limited to, derivative formulae, market pricing change, weightage given for a data element in an MLM, and weightage given for decision paths for explainability.

Explainability is the ability for a system to be explainable. A system may be explainable with respect to its aspects and relative to others in particular contexts. A system is explainable if an explainer can provide information (e.g., an explanation) to a user, enabling the user to understand an aspect of the system within a given context.

In another embodiment, systems and methods provided utilize a synthesizer within a QCP. The synthesizer may convert classical string requests into quantum format. One classical string request corresponds to one user request.

In yet another embodiment, the systems and methods provided herein are bidirectional. Bidirectionality means that, at any given step in the systems and methods provided, the next step chosen may be a prior or future step.

In yet an additional embodiment, the systems and methods provided enable dynamic, real-time decision-making. Real-time, dynamic derivate values may be obtained. And users may be given up-to-date dynamic data elements required for understanding underlying decision paths and weightages.

In some embodiments, the AI and ML processor may determine dynamically derived data values at least in part using historical data access frequency patterns. In some embodiments, the AI and ML processor may determine dynamically derived data values at least in part using dynamic market data. In some embodiments, the AI and ML processor may determine dynamically derived data values at least in part using both historical data access frequency patterns and dynamic market data.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to database backup, search, and recovery.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 2:
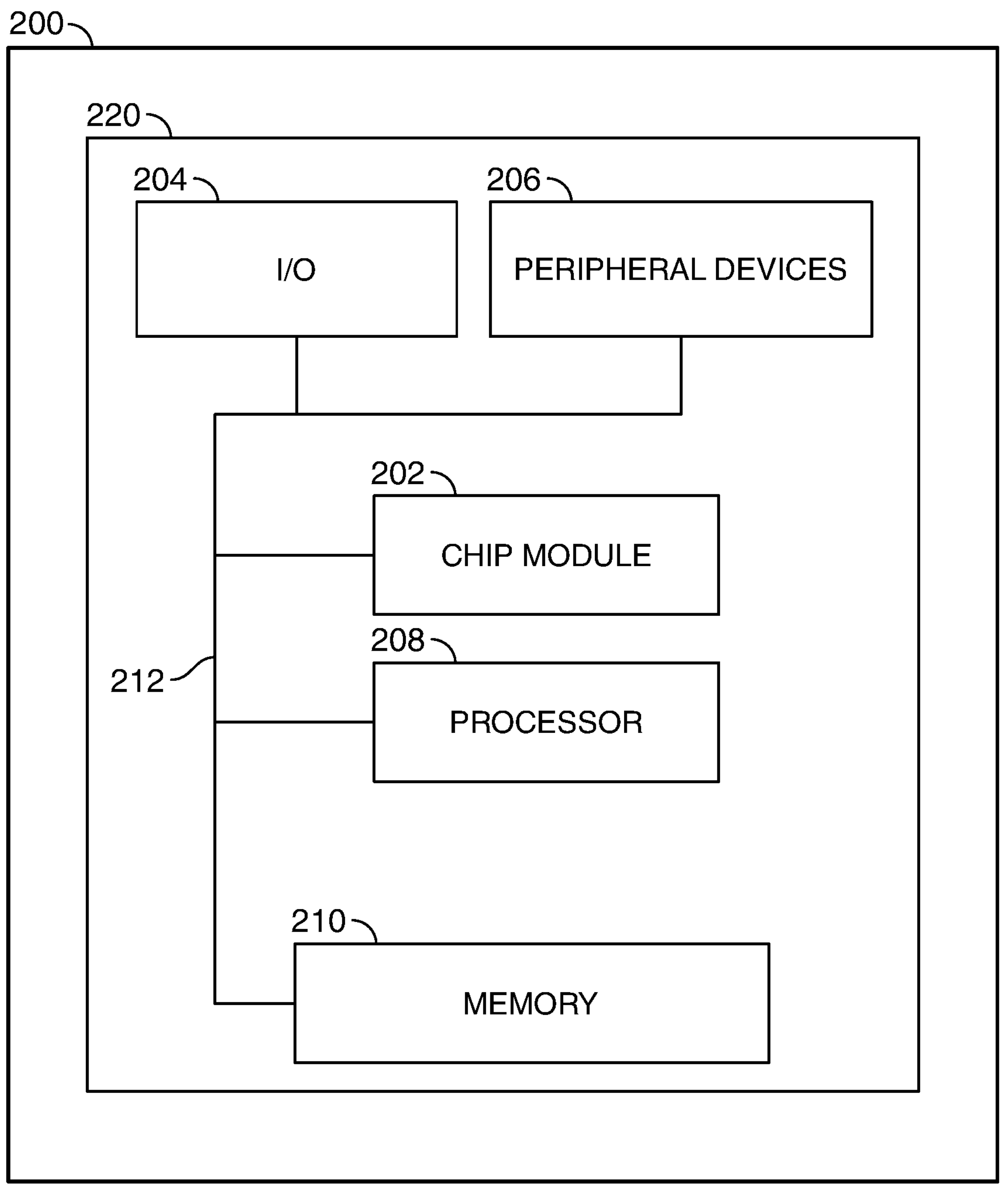
FIG. 2 shows another illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
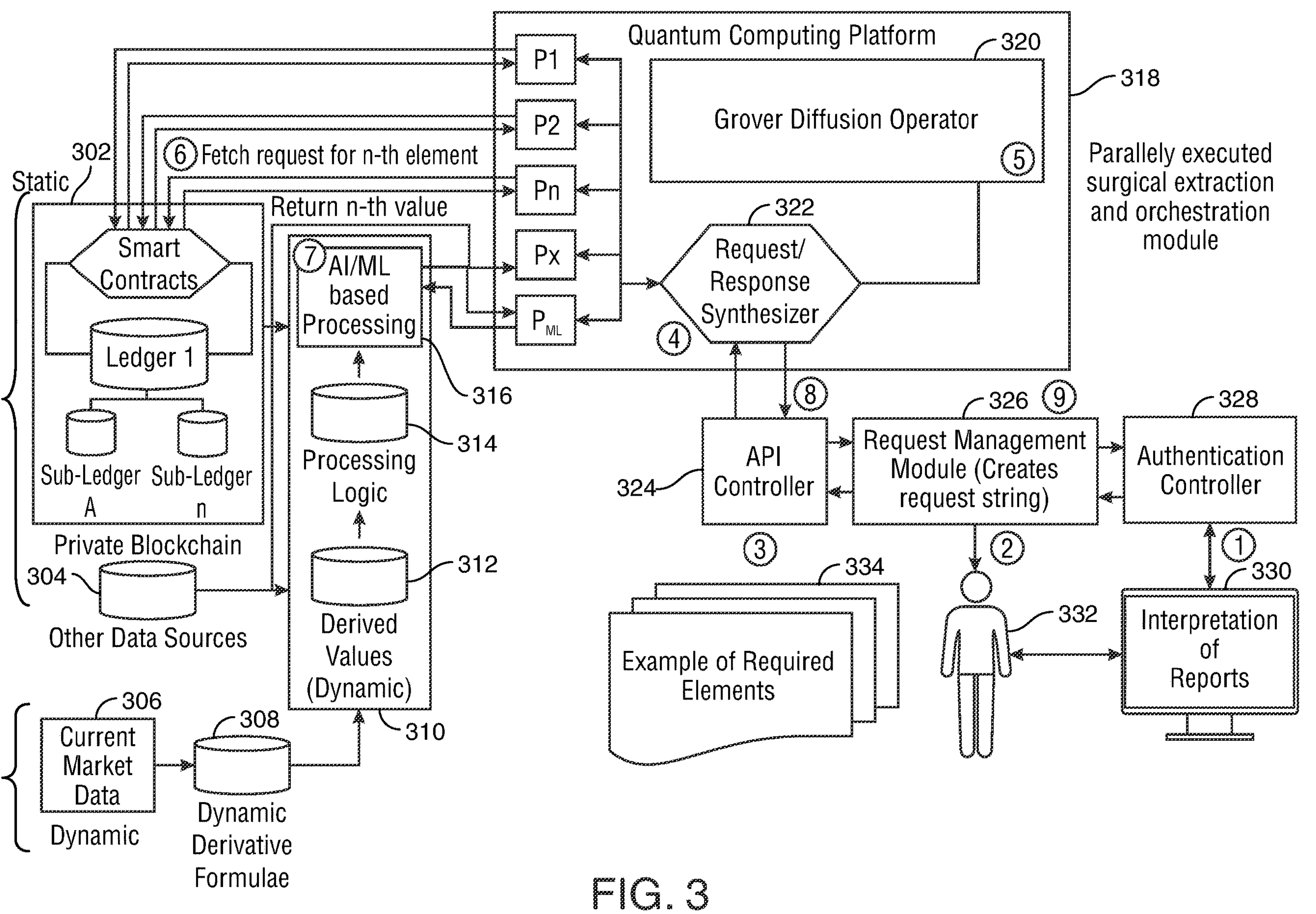
FIG. 3 shows yet another illustrative diagram in accordance with principles of the disclosure.

FIG. 3 shows an illustrative flowchart of the methods and systems in accordance with principles of the disclosure. FIG. 3 shows architecture and process steps of a hybrid-computing-powered system with multi-thread computing for confidential database surgical search and access-less data retrieval. FIG. 3 may be broken down into three detailed segments represented by FIGS. 4-6 below.

The methods and systems may begin with user 332. A user 332 may interpret one or more reports 330 and may determine one or more data elements 334 based on the interpreting one or more reports. The user 332 may request, via an API, one or more data elements pertinent to the one or more reports. The methods and systems may include the following:

The user 332 may authenticate (1), via an authentication controller 328, the requesting one or more data elements.

The user 332 may send (2), via the authentication controller 328, the one or more requested data elements to a request management module 326. Further, the user 332 may request, via the request management module 326, a synthesis of one or more request strings, via a classical processor, in response to the requesting one or more data elements.

The user 332 may interface (3), via an API controller 324, the one or more request strings with a quantum processor. The quantum processor may be located within a QCP 318. The QCP 318 may also be referred to as a parallelly executed surgical extraction and orchestration module.

The user 332 may synthesize (4) the one or more request strings with a request/response synthesizer 322. The request/ response synthesizer 322 may synthesize the one or more request strings into a format usable by a Grover diffusion operator.

The user 332 may convert (5), via a quantum processor, the one or more request strings into one or more quantum searches. The user 332 may convert the one or more request strings into one or more quantum searches by using one or more Grover's diffusion operators 320 in parallel with one another. The one or more quantum searches may be represented as P1, P2, Pn, Px, and $P_{ML}$. Pn may represent an n-th quantum search. The n-th data element value may be returned to Pn. Px may represent an x-th quantum search that receives information but does not provide information for computing. $P_{ML}$ may represent an ML quantum search that receives and provides information for ML computing.

User 332 may fetch (6) a quantum search for an n-th data element. The n-th data element may be a data element corresponding to the number "n." The n-th data element may be fetched from one or more smart contracts within a ledger. The ledger, represented by Ledger 1, may have sub-ledgers, represented by Sub-Ledger A and Sub-Ledger n. Smart contracts, ledgers, and sub-ledgers may be located within a static data source 302 such as a private blockchain.

The user 332 may fetch (7) one or more dynamically derived data values 312 from one or more other data sources 304 via a legacy transformation platform 310. The legacy transformation platform 310 may include the dynamically derived data values 312 and an MLM. The MLM may include a processing logic 314 and an AI/ML processor 316. Information may be passed from the static data source 302 to the legacy transformation platform 310 via the AI/ML processor 316. Further, dynamic current market data 306 may be fed through dynamic derivative formulae 308 into the legacy transformation platform 310 via the dynamically derived data values 312. Ultimately, the fetched dynamically derived data values 312 may be passed through the MLM. Further, weightage may be fetched from the dynamically derived data values passed through the MLM.

The user 332 may route (8) the fetched weightage for each of the dynamically derived data values 312 back through the QCP 318 the API controller 324, the request management module 326, and the authentication controller 328.

The user 332 may receive (9) the weightage for each of the dynamically derived data values 312.

Figure 4:
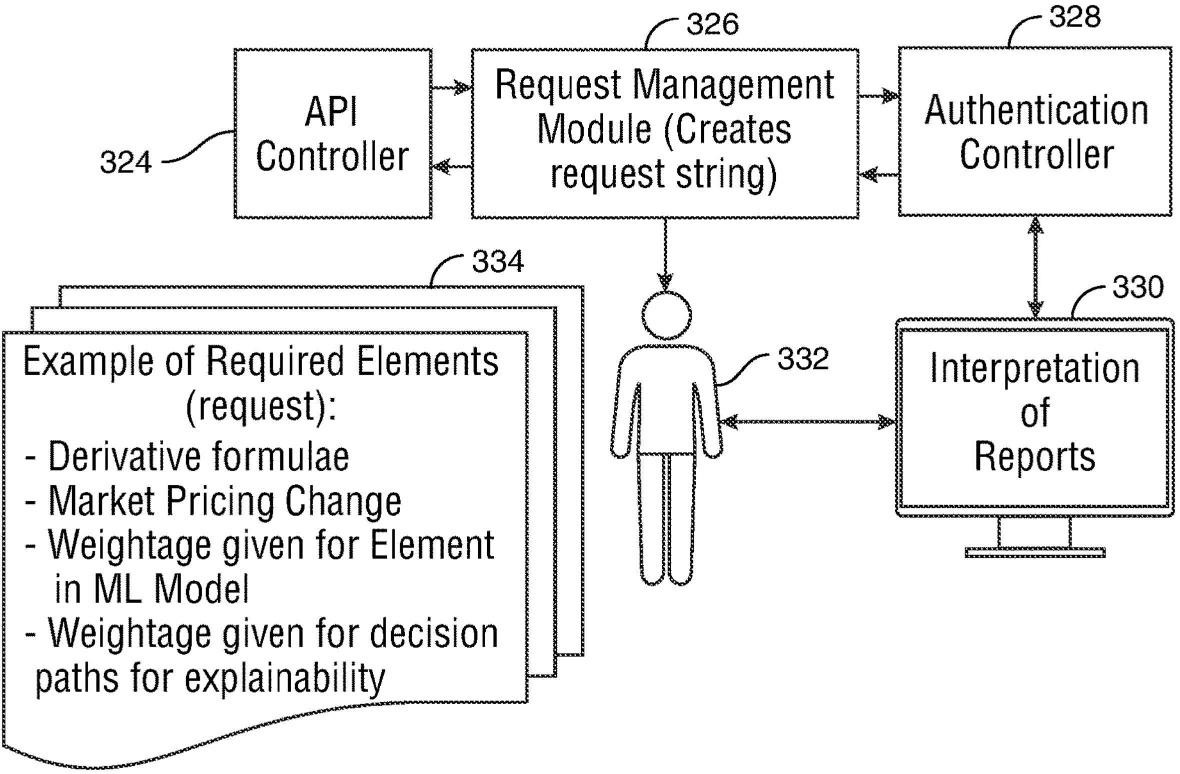
FIG. 4 shows an additional illustrative diagram in accordance with principles of the disclosure.

FIG. 4 shows an illustrative diagram in accordance with principles of the disclosure. The illustrative diagram includes user interpretation of reports 330, authentication controller 328, request management module 326, and API controller 324.

A user 332 may interpret reports 330 and make a request for one or more data elements 334 pertinent to the reports 330. Data elements 334 may include, but are not limited to, derivative formulae, market pricing changes, weightage given for data elements in an MLM, and weightage given for decision paths for explainability.

FIG. 4 shows that the user requests may be routed to an authentication controller 328. The authentication controller 328 may authenticate the user requests for one or more data elements pertinent to reports.

FIG. 4 shows that the user requests may then be routed to a request management module 326. Request management module 326 may utilize a classical processor to create a request string for each requested data element. The created request strings may then be sent to an API controller 324. The API controller 324 may enable the classical request strings to interface with a quantum computing engine. The API controller 324 accomplishes this by converting the classical string requests into a quantum format (e.g., qubits, quantum threads, and quantum request strings).

Figure 5:
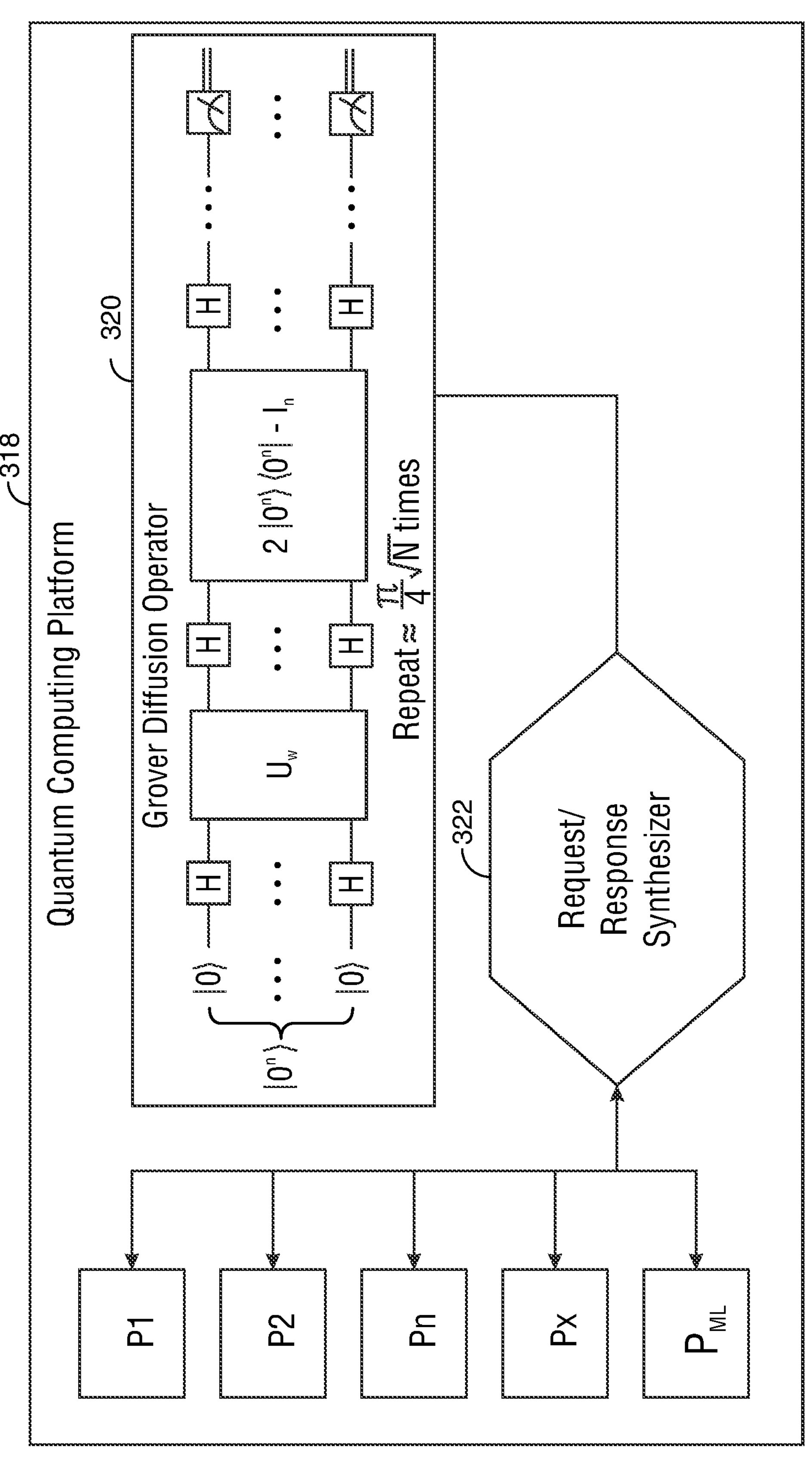
FIG. 5 shows still another illustrative diagram in accordance with principles of the disclosure.

FIG. 5 shows an illustrative diagram of an exemplary QCP 318, which may also be referred to as a parallelly executed surgical extraction and orchestration module, in accordance with principles of the disclosure.

FIG. 5 shows a request/response synthesizer 322 within QCP 318. The API controller 324 from FIG. 4 may flow directly into the request/response synthesizer 322. The request/response synthesizer 322 may take the quantum request strings and synthesize them in a way for the QCP 318 to begin Grover's searches for the requested data elements 334.

FIG. 5 shows that the request/response synthesizer 322 next sends the synthesized quantum request strings to a Grover's diffusion operator 320. The Grover's diffusion operator 320 transforms the quantum request strings into parallel quantum search threads, represented by P1, P2, Pn, Px, and $P_{ML}$. Pn represents an n number of requested data elements from a static source, such as a private blockchain. Px represents an x number of requested data elements from other data sources. $P_{ML}$ represents requested data elements processed by an MLM.

Figure 6:
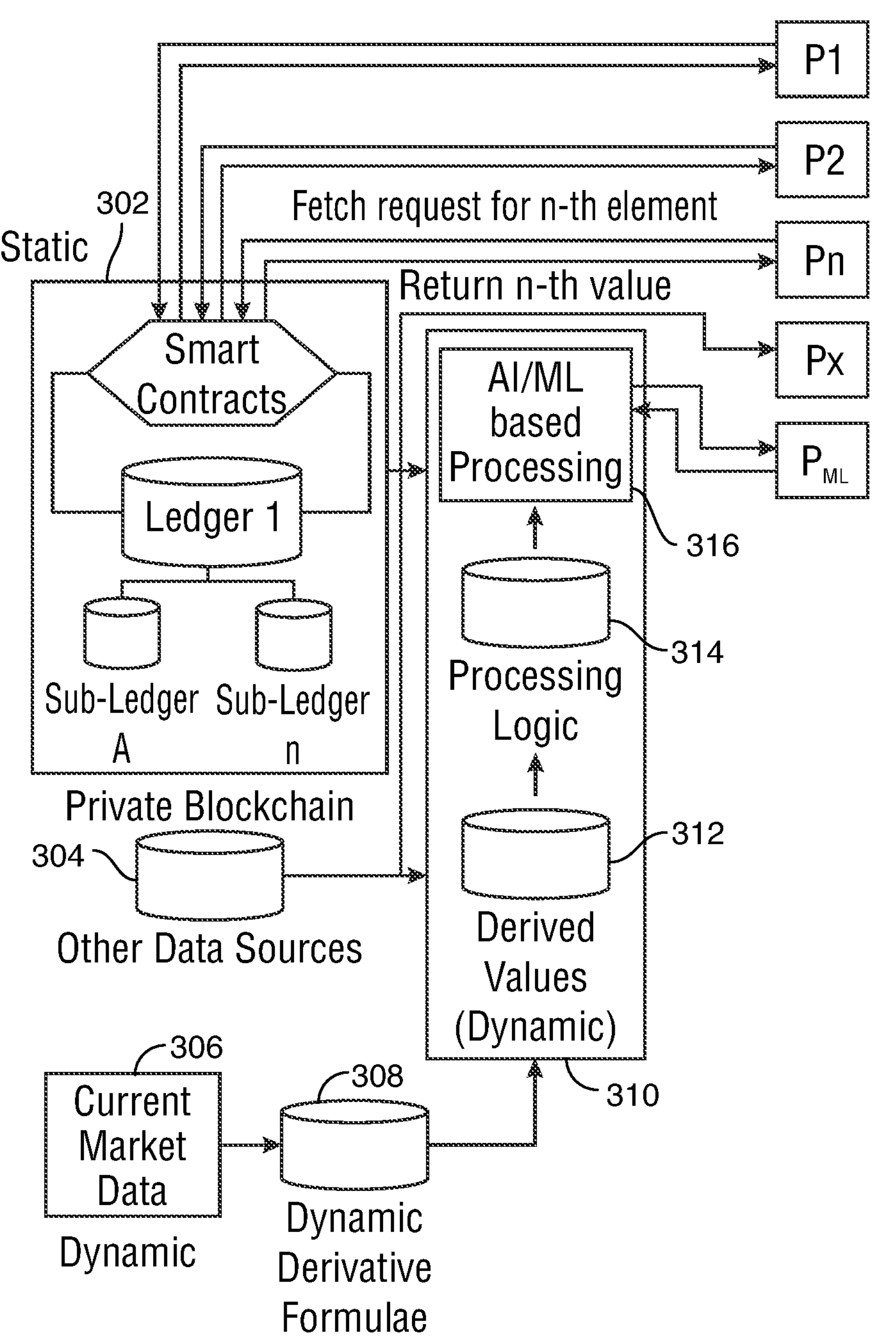
FIG. 6 shows further an illustrative diagram in accordance with principles of the disclosure.

FIG. 6 shows an illustrative diagram in accordance with principles of the disclosure. The parallel quantum threads, P1, P2, Pn, Px, and $P_{ML}$, from FIG. 5 may flow directly into a static private blockchain 302, made up of smart contracts, ledgers, and sub-ledgers. Exemplary ledger-1, and exemplary sub-ledgers, sub-ledger-A and subledger-n, are shown. From the static private blockchain 302, the systems and methods may fetch a request for an n-th element. "n" may represent a given number of requested data elements. The systems and methods may also return an n-th data element value back to the user.

FIG. 6 shows the parallel quantum threads from FIG. 5 may also flow directly into one or more other data sources 304 and dynamic current market data 306. Dynamic current market data 306, including, for example, up-to-date market data, may be provided to the system. On its way back to the user, current market data may be passed through dynamic derivative formulae 308. Then the current market data passed through the dynamic derivative formulae 308 may be passed through legacy transformation platform 310. Legacy transformation platform 310 may feed data reporting software back through QCP 318.

FIG. 6 shows that legacy transformation platform 310 may include, for example, dynamically derived data values 312, processing logic 314, and an AI and ML processor 316. The dynamically derived data values 312, via dynamic current market data 306 passed through the dynamic derivative formulae 308, and through the legacy transformation platform 310, are then routed back through the QCP 318, and back to the user 332. The three components of the methods and systems provided in FIG. 3, represented by FIGS. 4-6, may flow back and forth into one another. In this sense, the systems and methods provided are bidirectional in nature.

The steps of methods may be performed in orders beyond the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Systems and methods may omit features shown and/or described in connection with illustrative systems and methods. Embodiments may include features that are neither shown nor described in connection with the illustrative systems and methods. Features of illustrative systems and methods may be combined. For example, an illustrative embodiment may include features shown in connection with another illustrative embodiment.

The drawings show illustrative features of systems and methods in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for confidential database surgical search and access-less data retrieval using a hybrid-computing-powered system with multi-thread computing are provided. Persons skilled in the art will appreciate that the present disclosure can be practiced in other ways. The described embodiments are presented for purposes of illustration—not limitation—and the present disclosure is limited only by the claims that follow.

What is claimed is:

1. A method for confidential database searching and data retrieval using a hybrid-computing-powered system with multi-thread computing, said hybrid-computing-powered system comprising a classical processor and a quantum processor, the method comprising:

interpreting one or more reports;

requesting, via an application programming interface (API), one or more data elements pertinent to the one or more reports;

authenticating, via an authentication controller, the requesting one or more data elements;

requesting, via a request management module, a synthesis of one or more request strings, via the classical processor, in response to the requesting one or more data elements;

interfacing, via an API controller, the one or more request strings with the quantum processor, said quantum processor being located within a quantum computing platform (QCP);

converting, via the quantum processor, the one or more request strings into one or more quantum searches, said converting using one or more Grover's diffusion operators in parallel with one another;

fetching a quantum search for an n-th data element, wherein n is a number corresponding to the one or more data elements;

the n-th data element fetched from one or more smart contracts within a ledger, fetching one or more dynamically derived data values from one or more other data sources via a legacy transformation platform, said legacy transformation platform comprising dynamically derived data values, a machine learning model (MLM) comprising a processing logic, and an artificial intelligence (AI) and machine learning (ML) processor;

passing the fetched dynamically derived data values through the MLM;

fetching weightage given to the dynamically derived data values passed through the MLM;

routing the fetched weightage for each of the dynamically derived data values back through the QCP, the API controller, the request management module, and the authentication controller; and receiving the fetched weightage for each of the dynamically derived data values.

2. The method of claim 1 further comprising:

storing the fetched weightage in a database; and using the fetched weightage to make decisions based on the interpreting the one or more reports.

3. The method of claim 2 further comprising:

logging, in a cloud-based control file, the fetched weightage stored in the database; and using the cloud-based control file as part of making decisions based on the interpretation the one or more reports.

4. The method of claim 1 further comprising:

determining whether the fetched weightage is authentic; and only routing the fetched weightage to a user when it is determined that the fetched weightage is authentic.

5. The method of claim 1 wherein the converting, via the quantum processor, of the one or more request strings comprises converting a bit-based search algorithm into a qubit-based search algorithm.

6. The method of claim 1 wherein the AI and ML processor determines the fetched weightage at least in part using dynamic market data and historical market frequency patterns.

7. The method of claim 1 wherein the one or more other data sources comprises current market data analyzed via dynamic derivative formulae.

8. The method of claim 1 wherein the ledger comprises one or more sub-ledgers, and wherein the ledger is located within a private blockchain.

9. The method of claim 1 wherein the quantum processor comprises one or more quantum threads, each quantum thread comprising one or more quantum circuits.

10. The method of claim 1 wherein the dynamically derived data values comprise derivative formulae, market pricing change, weightage given for the one or more data elements in an ML model, or weightage given for decision paths for explainability.

11. A hybrid-computing-powered system with multi-thread computing for confidential database search and data retrieval, the hybrid-computing-powered system comprising:

a classical processor; and a quantum processor;

wherein a user of the hybrid-computing-powered system:

interprets one or more reports;

requests one or more data elements pertinent to the one or more reports;

authenticates, via an authentication controller, the requesting one or more data elements;

requests, via a request management module, a synthesis of one or more request strings, via the classical processor, in response to the request of one or more data elements;

interfaces, via an API controller, the one or more request strings with the quantum processor, said quantum processor being located within a quantum computing platform (QCP);

converts, via the quantum processor, the one or more request strings into one or more quantum searches, said converting uses one or more Grover's diffusion operators in parallel with one another;

fetches a quantum search for an n-th data element, wherein n is a number corresponding to the one or more data elements;

the n-th data element fetched from one or more smart contracts within a ledger, fetches one or more dynamically derived data values from one or more other data sources via a legacy transformation platform, said legacy transformation platform comprising dynamically derived data values, a machine learning model (MLM) comprising a processing logic, and an artificial intelligence (AI) and machine learning (ML) processor;

passes the fetched dynamically derived data values through the MLM;

fetches weightage given to the dynamically derived data values passed through the MLM;

routes the fetched weightage for each of the dynamically derived data values back through the QCP, the API controller, the request management module, and the authentication controller; and receives the fetched weightage for each of the dynamically derived data values.

12. The hybrid-computing-powered system of claim 11 further configured to:

store the fetched weightage in a database; and use the fetched weightage to make decisions based on the interpreting the one or more reports.

13. The hybrid-computing-powered system of claim 12 further configured to:

log, in a cloud-based control file, the fetched weightage stored in the database; and use the cloud-based control file as part of making decisions based on the interpreting the one or more reports.

14. The hybrid-computing-powered system of claim 11 further configured to:

determine whether the fetched weightage is authentic; and only route the fetched weightage to a user when it is determined that the fetched weightage is authentic.

15. The hybrid-computing-powered system of claim 11 wherein the converting, via the quantum processor, of the one or more request strings comprises converting a bit-based search algorithm into a qubit-based search algorithm.

16. The hybrid-computing-powered system of claim 11 wherein the AI and ML processor determines the fetched weightage at least in part using dynamic market data and historical market frequency patterns.

17. The hybrid-computing-powered system of claim 11 wherein the one or more other data sources comprises current market data analyzed via dynamic derivative formulae.

18. The hybrid-computing-powered system of claim 11 wherein the ledger comprises one or more sub-ledgers, and wherein the ledger is located within a private blockchain.

19. The hybrid-computing-powered system of claim 11 wherein the quantum processor comprises one or more quantum threads, each quantum thread comprising one or more quantum circuits.

20. The hybrid-computing-powered system of claim 11 wherein the dynamically derived data values comprise derivative formulae, market pricing change, weightage given for the one or more data elements in an ML model, or weightage given for decision paths for explainability.

* * * * *